UNITED STATES PATENT OFFICE 2,459,895

PROCESS OF RECOVERING BERYLLIUM OXIDE FROM BERYLLIUM ORE

Anton Schormuller, Painesville, Ohio, assignor to Clifton Products, Inc., Painesville, Ohio, a corporation of Ohio No Drawing. Application July 15, 1943, Serial No. 494,881

3 Claims. (Cl. 23—16)

This invention relates to the recovery of beryllium oxide from beryl or similar beryllium ore and has for its general purpose and object to simplify the procedure which has been followed heretofore in processes wherein sodium carbonate has been employed for the purpose of transforming such ore into water-soluble compounds, as well as to effect a great reduction in the proportion of sodium carbonate employed in such processes.

I have found that, by mixing potassium carbonate with sodium carbonate in the proportions referred to hereinafter, I am enabled, not only to effect a very substantial saving in the amount of sodium carbonate heretofore employed but also to greatly reduce the difficulties which its presence in such a large and wasteful proportion have engendered. I am also enabled to accomplish the extraction of beryllium oxide by what is in effect a continuous process, as distinguished from the batch treatments which have characterized prior processes wherein sodium carbonate has been employed for the purpose above mentioned.

In carrying out my new and improved process, I employ a sufficient amount of potassium carbonate (or not more than a 5% excess of the same) in the fluxing or melting operation to convert, in a later step, all of the alumina present in the ore into potassium alum. The potassium carbonate, as employed herein, performs three important functions: first, when mixed with sodium carbonate, it produces an easy melting mixture; second, it opens up or decomposes the ore and renders its constituents soluble in water or ready for acid decomposition; third, after treatment with sulphuric acid, it combines with the alumina, or aluminum sulphate, to produce crystalline potassium alum which can be readily removed.

In carrying out my process, I mix finely powdered beryl, or similar ore, having a beryllium oxide content of at least 5%, with potassium carbonate and sodium carbonate, employing only a sufficient quantity of potassium carbonate (or not more than 5% excess thereof) to combine with the alumina of the beryl, or similar ore, to form therewith potassium alum in a subsequent stage of the process. In treating beryl, I mix the same in approximately the proportions of 140 pounds of this ore to 40 pounds of potassium carbonate and to from 50 to 75 pounds of sodium carbonate. These variations in the proportions of sodium carbonate are sufficient to accommodate such variations as may exist in different apparatus wherein my process may be practiced. In my own practice, I have employed sodium carbonate in amounts varying from 65 to 70 pounds, with entirely satisfactory results.

Obviously, when beryllium ores other than beryl are utilized, the proportion of potassium carbonate employed therewith will be governed by the proportion of alumina present in such ores. I have determined that a variation of from 40 to 110 pounds of potassium carbonate to 140 pounds of beryllium ore will accommodate all variations between the alumina content of beryl and that of all other practically available beryllium ores having a beryllium oxide content of at least 5%, while the above variation of from 50 to 75 pounds in the amount of sodium carbonate used will be sufficient to enable it to react satisfactorily with the same amount of the said ores.

The mixture, formed as described, is melted in the usual manner, the slag resultant therefrom is cooled and powdered and is treated with sufficient sulphuric acid to decompose all silicates and produces potassium alum in a later stage of the operation. The slurry produced by such decomposition is heated to a temperature of approximately 400–500° F., whereby the silica is rendered insoluble, being transformed into a powder; the insoluble powder is then extracted from the slurry with water and removed from the slurry by filtering same.

After the removal of the silica by filtration, the resultant solution is evaporated until it attains a specific gravity of about 1,450 (while boiling) and wherein essentially all of the alumina present will have been converted into potassium alum. After cooling, substantially all of the alum can then be separated by centrifuging and the remaining mother liquid collected and processed in the ordinary manner for the recovery of beryllium oxide.

In the practice of the old processes referred to hereinbefore, after the soluble salts have been extracted from the melt, the resultant liquor has been evaporated to a suitable specific gravity, following which ammonium sulphate has been added (either as a powder or as a saturated aqueous solution); and finally, after the gravity of the resultant liquid has been checked and adjusted, the crystallization cycle is started. The performance of these steps is rendered difficult by the initial use, in such processes, of the large amount of sodium carbonate referred to hereinbefore, the excess whereof is thrown away when the beryllium oxide is finally recovered.

In the practice of my process, since the liquor obtained from the potash-soda ash melt contains all of the necessary ingredients, the crystallization can be started as soon as the desired gravity of the extract has been attained. It is due to this important advantage that my process is in effect a continuous process, whereas the prior processes referred to are in the nature of "batch" processes—and this continuity is effected without interference and delay due to the presence of an excess of sodium carbonate.

From the foregoing, it will be evident that I have greatly simplified the process of manufacturing beryllium oxide by the use of potassium carbonate in the manner described herein; and that, by eliminating the use of sodium carbonate alone as the initial fluxing agent, I have not only effected a large saving in the quantity of this reagent that has been used heretofore for this purpose, but have effected a great saving in labor and a great speed-up in production.

Having thus described my invention, what I claim is:

1. The process of extracting beryllium oxide from beryl which comprises: mixing powdered beryl, having a beryllium oxide content of at least 5% and having alumina therein, with potassium carbonate and sodium carbonate in substantially the proportions of 140 pounds of beryl with 40 pounds of potassium carbonate and with from 65 to 70 pounds of sodium carbonate; fusing the mixture thus formed; cooling and powdering the resultant slag; treating the powdered slag with a sufficient proportion of sulphuric acid to form a liquid slurry therefrom and to decompose the silicates into silica and facilitate the formation of potassium alum from the alumina constituent of the slag; heating the slurry thus produced to change the silica into insoluble silica; extracting the slurry to obtain in solution materials other than silica; filtering out the silica; heating the solution to concentrate same to a specific gravity to about 1.450 while boiling; cooling the solution to form crystalline potassium alum; removing the alum; and processing the resultant liquid for the recovery of beryllium oxide.

2. In the process of extracting beryllium oxide from a beryllium ore having a beryllium oxide content of at least 5% and containing alumina, the steps which comprise: mixing the powdered ore with potassium carbonate and sodium carbonate in substantially the proportions of 140 pounds of such ore with from 40 to 110 pounds of potassium carbonate and with from 50 to 75 pounds of sodium carbonate; fusing the mixture thus formed; cooling and powdering the resultant slag; treating the powdered slag with a sufficient proportion of sulphuric acid to decompose the silicates and to form potassium alum with the alumina constituent of the slag; dehydrating the liquid thus produced to change the silica in the ore into insoluble silica; extracting the slurry to obtain in solution materials other than silica; filtering out the silica; concentrating the resultant solution to a point wherein crystalline potassium alum will be formed; and removing the alum and processing the resultant liquid for the recovery of beryllium oxide.

3. The process of extracting beryllium oxide from beryl which comprises: mixing the powdered beryl with potassium carbonate and sodium carbonate in substantially the proportions of 140 pounds of beryl with 40 pounds of potassium carbonate and with from 50 to 75 pounds of sodium carbonate; fusing the mixture thus formed; cooling and powdering the resultant slag; treating the powdered slag with a sufficient proportion of sulphuric acid to decompose the silicates and to form potassium alum with the alumina constituent of the slag; dehydrating the liquid thus producing by heating the liquid to change the silica in the ore into insoluble silica; extracting the slurry to obtain in solution materials other than silica; filtering out the silica; concentrating the resultant solution and cooling same to a point wherein crystalline potassium alum will be formed; and removing the alum and processing the resultant liquid for the recovery of beryllium oxide.

ANTON SCHORMULLER.

REFERENCES CITED

The following references are of record in the file of this patent:

UNITED STATES PATENTS

| Number | Name | Date |
| --- | --- | --- |
| 1,656,660 | Brush | Jan. 17, 1928 |
| 1,982,873 | James | Dec. 4, 1934 |

OTHER REFERENCES

On Glucinum and Its Compounds, by C. A. Joy, in American Journal of Science and Arts, vol. 36 (2nd series), 1863, pages 83–91.

J. of Chem. Soc., vol. 63 (1893), pages 909 and 910.

Hopkins, Chemistry of the Rarer Elements, edition of 1923, p. 85.